United States Patent [19]

Itoh et al.

[11] Patent Number: 5,318,848
[45] Date of Patent: Jun. 7, 1994

[54] MODIFIED SILICA GEL IN CHROMATOGRAPHY PACKING MATERIAL

[75] Inventors: Kenji Itoh, Nagoya; Hideo Nagashima; Kiyokatsu Jinno, both of Toyohashi; Yutaka Ohtsu, Yokohama, all of Japan

[73] Assignee: Shiseido Company Ltd., Tokyo, Japan

[21] Appl. No.: 768,842
[22] PCT Filed: Jan. 24, 1991
[86] PCT No.: PCT/JP91/00075
§ 371 Date: Sep. 24, 1991
§ 102(e) Date: Sep. 24, 1991
[87] PCT Pub. No.: WO91/11711
PCT Pub. Date: Aug. 8, 1991

[30] Foreign Application Priority Data

Jan. 26, 1990 [JP] Japan .................................. 2-16586

[51] Int. Cl.$^5$ ............................................. G01N 30/48
[52] U.S. Cl. .................................. 428/405; 210/198.2; 210/656; 427/215; 428/404; 502/401
[58] Field of Search ............... 428/405, 404; 502/401; 210/198.2, 656; 427/215

[56] References Cited

U.S. PATENT DOCUMENTS

| | | | |
|---|---|---|---|
| 3,984,349 | 10/1976 | Meiller et al. | 502/401 |
| 4,746,572 | 5/1988 | Glajch | 428/405 |
| 4,782,040 | 11/1988 | Revis et al. | 428/405 |
| 4,828,695 | 5/1989 | Yamamura et al. | 210/656 |
| 4,835,058 | 5/1989 | Komiya et al. | 428/405 |
| 4,837,195 | 6/1989 | Cox et al. | 210/656 |

FOREIGN PATENT DOCUMENTS 0117324 9/1984 European Pat. Off. .
0269447 6/1988 European Pat. Off. .

OTHER PUBLICATIONS

Journal of Chromatography, 527 (1990) Sep. 26, pp. 193-207.

Primary Examiner—D. S. Nakarani
Attorney, Agent, or Firm—Sprung Horn Kramer & Woods

[57] ABSTRACT

A packing material for a liquid chromatograph is provided particularly to be used for separating polycyclic aromatic compounds. The packing material is prepared by treating a base material of the packing material with a coupling agent of the formula (I):

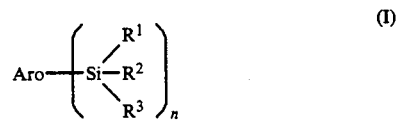

wherein Aro is an aromatic moiety, $R^1$ and $R^2$ are independently alkyl, alkenyl, aryl, lower alkoxy group, or halogen atom, $R^3$ is a lower alkoxy group or halogen atom. Since an aromatic moiety within one molecule is immobilized through many functional groups on the surface of the base material, the packing material has stable and excellent separating properties.

3 Claims, 6 Drawing Sheets

MODIFIED SILICA GEL IN CHROMATOGRAPHY PACKING MATERIAL

DESCRIPTION

1. Technical Field

This invention relates to a packing material for chromatography and in particular, to an improvement of a surface modifying agent.

The present packing material, especially can be used for separation and analysis of polycyclic aromatic compounds and related compounds.

2. Background Art

Chromatography has been employed for separation and purification of various chemical components.

In such chromatography, as the packing material for adsorption chromatography in which mutual separation between the sample molecules is accomplished through the bipole-bipole interaction, $\pi$ electron - $\pi$ electron interaction or hydrogen bond formation force between the sample molecules (or analyzed molecule) and the packing material surface, the whole porous silica gel having macropores and micropores distributed in a network or the porous polymeric material obtained by copolymerization of styrene, etc. has been employed. Particularly, the packing material of a porous silica gel surface modified with a silane coupling agent is different in separation characteristics of sample molecules depending on the structure of the silane coupling agent employed, and therefore useful for efficient separation of sample molecules having various structures.

Incidentally, as the surface modifying agent of the surface-modified silica gel to be used as the packing agent for chromatography, the octadecylsilyl derivative in most widely used, and also butylsilyl derivative, octylsilyl derivative, etc. have been employed.

However, all of these have only one functional group for silylation capable of bonding to the silica gel surface in one molecule, and therefore in a developing solvent for chromatography, functional groups which influence separation characteristics such as the octadecyl group, butyl group, octyl group at the interface between the filler and the solvent exist in disordered form on the silica gel surface. Further, the octadecyl group, butyl group, octyl group, etc. have carbon chains constituting the molecules that are freely rotatably, and therefore there is no homogeneity in the adsorption form when sample molecules are practically adsorbed onto the packing material surface. Such absence of homogeneity is a crucial defect in designing the surface modifying agent to obtain the most suitable stationary phase depending on the structure of sample molecules.

The present invention has been accomplished in view of the problem of the prior art as mentioned above, and its object is to provide a packing material for chromatography that can separate various substances, and further can efficiently be useful for separation and purification within a short time.

DISCLOSURE OF INVENTION

For accomplishing the above object, the present inventors have studied intensively, and consequently found that excellent separation characteristics can be exhibited by having the organic functional groups regularly arranged on the surface of base material for the packing material by use of an aromatic compound having a plurality of functional groups for silylation in one molecule (hereinafter called "multi-legged type silane coupling agent") as the surface modifying agent, to accomplish the present invention.

Accordingly, the present invention provides a packing material for chromatography characterized by modifying the surface of base material of the packing material with a multi-legged type silane coupling agent.

Further, a method for preparation of the packing material for chromatography that comprises reacting a multi-legged type silane coupling agent having a chlorine atom or lower alkoxy group as a- reactive group to a porous silica gel with the silica gel.

Such packing material has an excellent stability and separation characteristics, since aromatic compound moiety constructed of the present silane coupling agent is immobilized on the surface of the base material through the multi-legged type functional groups (a plurality of functional groups).

BEST MODE FOR CARRYING OUT THE INVENTION

Figure 2:
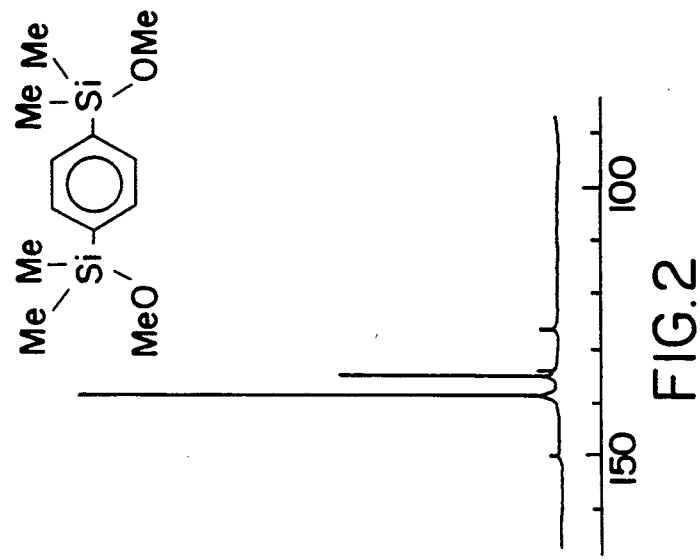
FIG. 2 is a $^{13}$C-NMR spectrum of para-bis(dimethylmethoxysilyl)benzene in deuterochloroform.

In the present invention, the term "base material for packing material" refers a base material having a large surface area, and particles bearing silanol groups that are able to couple the usual coupling agent therewith, for example, and is preferably enclosed in a silica gel, porous glass, spherical clay mineral and the like. Most preferably, the material encloses a porous silica gel.

By the "multi-legged type silane coupling agent "term refers a compound having plural reactive groups for silylation, and has specifically the formula (I):

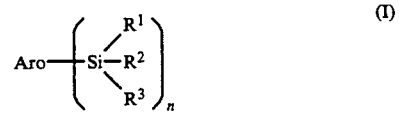

wherein Aro represents an aromatic residue;

$R^1$ and $R^2$ are independently an alkyl group of 1 to 20 carbon atoms, alkenyl group of 3 to 5 carbon atoms, aryl group of 6 to 12 carbon atoms and may be substituted by a lower alkyl or halogen, lower alkoxy group, or halogen atom;

$R^3$ is a lower alkoxy group or halogen atom, and
n is an integral number from 2 to 5.

The "lower alkyl" to be used therein means an alkyl having 1 to 5 of carbon atoms. The referred "an aromatic moiety releasing hydrogen atoms in accordance with the number of n" for Aro means an aromatic residue having the bonding sites in accordance with the number of the reactive groups for silylation (or silylation functional groups).

Therefore, said multi-legged type silane coupling agent results in a substitution reaction with, for example the silanol groups on the surface of the porous silica gel through the functional groups thereof, and the aromatic ring can be immobilized parallel to the surface at a particular position thereof.

An example of the Aro's includes, but is not limited to, the residue derived from benzene, naphthalene, anthracene, pyrene, acenaphthylene, biphenyl, 1,3,5-tris(-phenyl) benzene, thiophene and pyridine, and may be substituted by a lower alkyl or halogen, e.g., fluorine, chlorine or bromine.

$R^1$ and $R^2$ are an alkyl group having 1 to 20 carbon atoms, i.e., straight or branched chain aliphatic group from methyl to eicosyl, and are preferably a lower alkyl, such as methyl, ethyl, n-propyl, iso-propyl, n-butyl, tert.-butyl, n-pentyl. Further, the $R^1$ and $R^2$ may be an alkenyl group such as allyl, 2- or 3-butene; unsubstituted or substituted aryl such as phenyl, 4-methylphenyl, 4-chlorophenyl, naphthalene-1-yl or naphthalene-2-yl; lower alkoxy such as methoxy, ethoxy, n-propoxy, iso propoxy or n-butoxy; halogen such as chlorine, bromine or iodine. Of the groups described above, the halogen and alkoxy, the same as the following $R^3$ group, can also be reacted with the reactive groups on the surface of the base material for the packing material, e.g., silanol group on the silica gel.

$R^3$ is a lower alkoxy group such as methoxy, ethoxy, n-propoxy, iso-propoxy or n-butoxy; or halogen atom, e.g., chlorine, bromine or iodine, and is most preferably methoxy and chloro in view of the surface modification of the base material.

Although $R^1$, $R^2$ and $R^3$ described above may be the same group simultaneously, i.e., the same lower alkyl or halogen atom, $R^1$ and $R^2$ are preferably different from $R^3$ to smoothly accomplish the surface modification. Further, $R^1$ and $R^2$ can be the same or different, but they are preferably the same because production of the silane coupling agent is easy.

n is an integral number from 2 to 5, generally an aromatic moiety of the silane coupling agent, and is immobilized by bondings corresponding to the number of n on the surface of the base material.

The silane coupling agents used in the present invention especially consist of, but are not limited to, the following combination of moieties, having the formula:

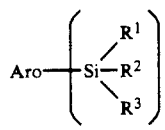

| Aro | $R^1$ | $R^2$ | $R^3$ | n |
|---|---|---|---|---|
| –⟨phenyl⟩– | $CH_3$ | $CH_3$ | Cl | 2 |
| –⟨phenyl⟩– | $CH_3$ | $CH_3$ | Br | 2 |
| –⟨phenyl⟩– | $CH_3$ | $CH_3$ | $OCH_3$ | 2 |
| –⟨phenyl⟩– | $CH_3$ | $CH_3$ | $OC_2H_5$ | 2 |
| –⟨phenyl⟩– | $C_2H_5$ | $C_2H_5$ | Cl | 2 |
| –⟨phenyl⟩– | $C_2H_5$ | $C_2H_5$ | $OCH_3$ | 2 |

-continued
$$\text{Aro} - \left( \text{Si} \begin{array}{c} R^1 \\ R^2 \\ R^3 \end{array} \right)_n$$
| Aro | R¹ | R² | R³ | n |
|---|---|---|---|---|
| 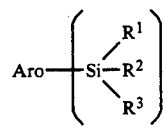 | $C_3H_7$ | $C_3H_7$ | Cl | 2 |
| 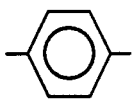 | $CH_3$ | Cl | Cl | 2 |
| 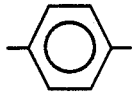 | Cl | Cl | Cl | 2 |
| 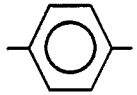 | $CH_3$ | $OCH_3$ | $OCH_3$ | 2 |
| 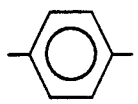 | $OCH_3$ | $OCH_3$ | $OCH_3$ | 2 |
| 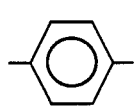 | $OC_2H_5$ | $OC_2H_5$ | $OC_2H_5$ | 2 |
| 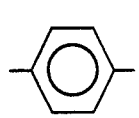 | $CH_3$ | $CH_3$ | Cl | 3 |
| 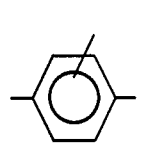 | $CH_3$ | $CH_3$ | $OCH_3$ | 3 |
| 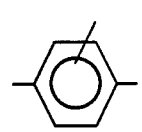 | $CH_3$ | $CH_3$ | $OC_2H_5$ | 3 |
| 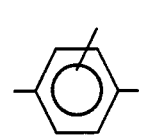 | $CH_2-CH=CH_2$ | $CH-CH=CH_2$ | Cl | 2 |
| 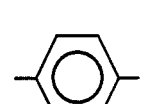 | $CH_2-CH=CH_2$ | $CH_2-CH=CH_2$ | $OCH_3$ | 2 |

-continued
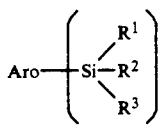
| Aro | R¹ | R² | R³ | n |
|---|---|---|---|---|
| 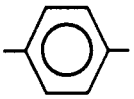 | $CH_2-CH=CH_2$ | $CH_2-CH=CH_2$ | $OC_2H_5$ | 2 |
|  | $CH_2-CH=CH-CH_3$ | $CH_2-CH=CH-CH_3$ | Cl | 2 |
| 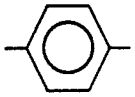 |  |  | Cl | 2 |
| 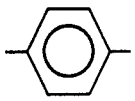 |  |  | $OCH_3$ | 2 |
| 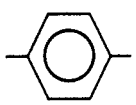 |  |  | $OC_2H_5$ | 2 |
| 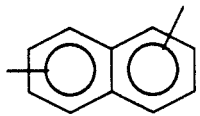 | $CH_3$ | $CH_3$ | Cl | 2 |
| 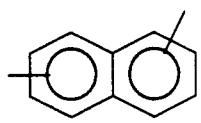 | $CH_3$ | $CH_3$ | Br | 2 |
| 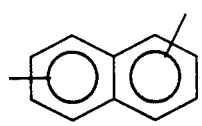 | $CH_3$ | $CH_3$ | $OCH_3$ | 2 |
| 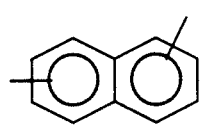 | $CH_3$ | $CH_3$ | $OC_2H_5$ | 2 |
| 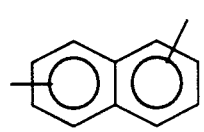 | $C_2H_5$ | $C_2H_5$ | Cl | 2 |
| 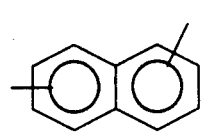 | $C_2H_5$ | $C_2H_5$ | $OCH_3$ | 2 |

-continued
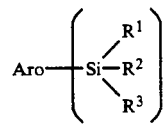
| Aro | R¹ | R² | R³ | n |
|---|---|---|---|---|
| naphthalene | CH₃ | CH₃ | Cl | 2 |
| naphthalene | CH₃ | CH₃ | OCH₃ | 2 |
| naphthalene | CH₂—CH=CH₂ | CH₂—CH=CH₂ | Cl | 2 |
| naphthalene | CH₂—CH=CH₂ | CH₂—CH=CH₂ | OCH₃ | 2 |
| naphthalene | phenyl | phenyl | Cl | 2 |
| naphthalene | phenyl | phenyl | OCH₃ | 2 |
| anthracene | CH₃ | CH₃ | Cl | 2 |
| anthracene | CH₃ | CH₃ | OCH₃ | 2 |
| anthracene | C₂H₅ | C₂H₅ | Cl | 2 |

-continued
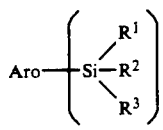
| Aro | R¹ | R² | R³ | n |
|---|---|---|---|---|
| 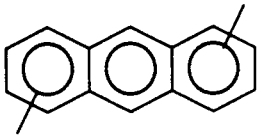 |  |  | Cl | 2 |
| 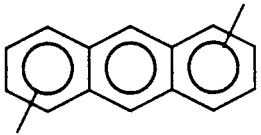 |  |  | OCH₃ | 2 |
| 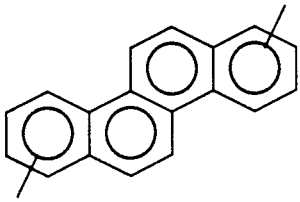 | CH₃ | CH₃ | Cl | 2 |
| 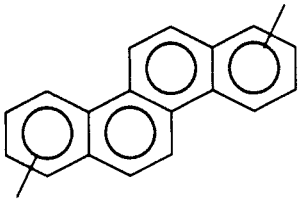 | CH₃ | CH₃ | OCH₃ | 2 |
| 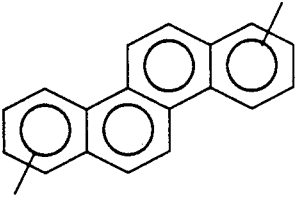 |  |  | Cl | 2 |
| 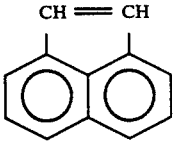 | CH₃ | CH₃ | Cl | 2 |
| 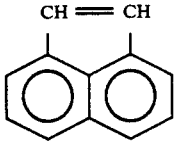 | CH₃ | CH₃ | OCH₃ | 2 |
| 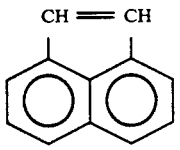 |  |  | Cl | 2 |

-continued
$$Aro \left( Si \begin{matrix} R^1 \\ R^2 \\ R^3 \end{matrix} \right)_n$$
| Aro | R¹ | R² | R³ | n |
|---|---|---|---|---|
| 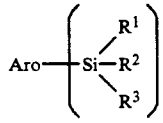 | 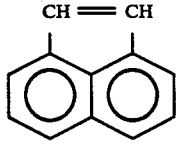 |  | OCH₃ | 2 |
|  | CH₃ | CH₃ | Cl | 2 |
| 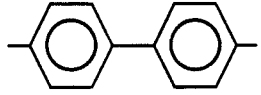 | CH₃ | CH₃ | OCH₃ | 2 |
| 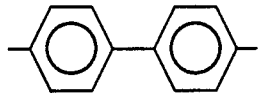 | C₂H₅ | C₂H₅ | Cl | 2 |
| 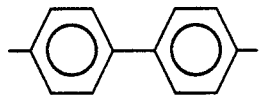 | C₂H₅ | C₂H₅ | OCH₃ | 2 |
| 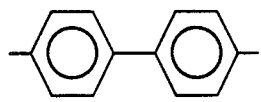 | CH₂—CH=CH₂ | CH₂—CH=CH₂ | Cl | 2 |
| 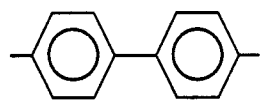 | CH₂—CH=CH₂ | CH₂—CH=CH₂ | OCH₃ | 2 |
| 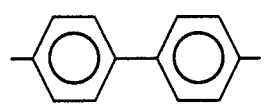 | 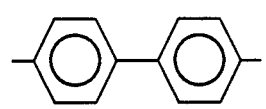 |  | Cl | 2 |
|  | 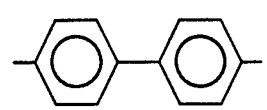 |  | OCH₃ | 2 |
|  | CH₃ | CH₃ | Cl | 3 |

-continued
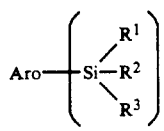
| Aro | R¹ | R² | R³ | n |
|---|---|---|---|---|
| (1,3,5-tri(4-yl-phenyl)benzene) | CH₃ | CH₃ | OCH₃ | 3 |
| (1,3,5-tri(4-yl-phenyl)benzene) | C₂H₅ | C₂H₅ | Cl | 3 |
| (1,3,5-tri(4-yl-phenyl)benzene) | C₂H₅ | C₂H₅ | OCH₃ | 3 |
| (1,3,5-tri(4-yl-phenyl)benzene) | CH₂—CH=CH₂ | CH—CH=CH₃ | Cl | 3 |

-continued $$Aro \left( Si \begin{matrix} R^1 \\ R^2 \\ R^3 \end{matrix} \right)_n$$

| Aro | R¹ | R² | R³ | n |
|---|---|---|---|---|
| 1,3,5-tris(4-phenyl)benzene | CH₂—CH=CH₂ | CH₂—CH=CH₃ | OCH₃ | 3 |
| 1,3,5-tris(4-phenyl)benzene | phenyl | phenyl | Cl | 3 |
| 1,3,5-tris(4-phenyl)benzene | phenyl | phenyl | OCH₃ | 3 |
| thiophene-2,5-diyl | CH₃ | CH₃ | Cl | 2 |
| thiophene-2,5-diyl | CH₃ | CH₃ | OCH₃ | 2 |
| thiophene-2,5-diyl | phenyl | phenyl | Cl | 2 |
| thiophene-2,5-diyl | phenyl | phenyl | OCH₃ | 2 |

-continued $$Aro\left(Si\begin{array}{c}R^1\\-R^2\\R^3\end{array}\right)_n$$

| Aro | R¹ | R² | R³ | n |
|---|---|---|---|---|
| [pyridyl] | CH₃ | CH₃ | Cl | 2 |
| [pyridyl] | [phenyl] | [phenyl] | Cl | 2 |

Representative examples of the silane coupling agents described above can be included para-bis(chlorodimethylsilyl) benzene, para-bis(dimethylmethoxysilyl)benzene, 1,3,5-tris(4-chlorodimethylsilylphenyl)benzene, para-bis(chlorodiphenylsilyl)benzene and 4,4′-bis(-chlorodimethylsilyl)biphenyl.

The silane coupling agents are commercially available and known per se, and may be easily prepared by a known technique.

Further, the "surface modifying with such silane coupling agent" means that their functional groups, such as halogen atom or alkoxy groups, are allowed to react with the silanol groups on the surface of the silica gel to raise dehydrohalogenation or dealkoxylation, and thereby the plural silanol groups of the silica gel are substituted for an aromatic ring moiety of one molecular silane coupling agent.

The surface-modified silica gel has approximately 1 to 2 aromatic rings bonded per area of 100 Å square, when subjected to a measurement of carbon content by elemental analysis. Since the aromatic rings are bonded to the surface through the silyl groups directly connected to two or more aromatic rings, these aromatic rings are estimated to exist parallel to the surface, just so as to cover the silica gel surface with the aromatic rings, and this estimation is supported by a solid high resolution NMR spectrum.

The surface modifying described above is easily accomplished by a method for preparation of the packing material according to other inventions. For example, the surface modified packing material can be formed through reacting a silane coupling agent of the formula (I) with a porous silica gel dispersed in an aromatic hydrocarbon solvent. The solvent includes benzene, toluene, xylene, halogenated benzenes, e.g., chlorobenzene, etc. The reaction generally can be carried out by heating the reactive mixture under a refluxing temperature of the solvent for thirty minutes to ten hours, and if desired, an organic amine compound such as pyridine and triethylamine may be added into the reactive mixture. The resulting surface modified packing material is removed by filtration, washed with a suitable organic solvent, and then dried for use as a packing material for liquid chromatography.

EXAMPLES

The following examples are to illustrate the invention but should not be interpreted as a limitation thereon. All percentages of the reactants are by weight.

Synthesis of surface-modified silica gel

Example 1

Preparation of the packing material using para-bis(chlorodimethylsilyl)benzene

An amount 0.75 g of para-bis(chlorodimethylsilyl)benzene is dissolved in 5 ml of dried toluene, 1 g of a porous silica gel suspended in 5 ml of toluene containing 0.45 g of pyridine is added, and the mixture was heated under reflux for 6 hours. After the silica gel is sedimented by being left to cool, the supernatant is removed with a pipette. The silica gel thus obtained is shaken with addition of 10 ml of chloroform, left to stand, followed by removal of the supernatant, of which a washing procedure is repeated three times. Next, the silica gel was separated by filtration by use of a membrane filter, and washed three times with methanol. The surface-modified silica gel according to this method can be dried and used as the packing material for liquid chromatography.

Figure 1:
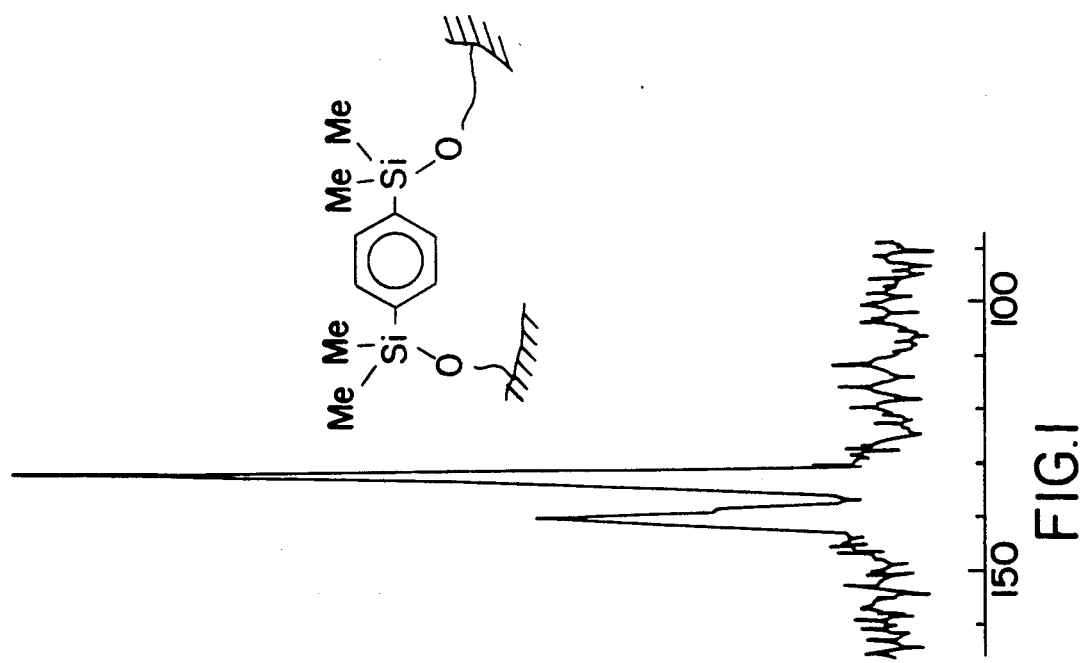
FIG. 1 is a $^{13}$C-solid state high resolution NMR spectrum of the packing material for chromatography according to an example of the present invention.

The surface-modified silica gel synthesized according to this method is confirmed to contain 7.97% of carbon by elemental analysis. It is also confirmed from NMR spectrum that the multi-legged type silane coupling agent is bonded to the silica gel and benzene rings exist parallel to the surface. FIG. 1 shows the solid-state high resolution NMR spectrum ($^{13}$C) of the surface-modified silica gel. The spectrum corresponding to the carbon of the benzene structure in the spectrum comprises two large peaks with an intensity ratio of 1:2, each being attributable to the carbon directly bonded to the dimethylsilyl substituent and the carbon directly bonded to hydrogen. This is substantially identical with the spectrum corresponding to the benzene structure in the $^{13}$C-NMR spectrum in deuterochloroform of para-bis(dimethylmethoxysilyl)benzene shown in FIG. 2, showing that the skelton of para-bis(dimethylsilyl)benzene is doubtlessly held on the solid.

Example 2

Preparation of the packing material using para-bis(dimethylmethoxysilyl)benzene

The surface-modified silica gel having the para-bis(-dimethylsilyl)benzene skeleton carried on silica gel described in Example 1 can be also obtained by heating 0.71 g of para-bis(dimethylmethoxysilyl)benzene together with a porous silica gel suspended in 10 ml of toluene. In this case, for removing the methanol formed, the mixture is heated under reflux for one hour followed by removal of the solvent by distillation, and then 10 ml of toluene was freshly added and the mixture is heated under refluxing for one hour, the procedure of which is repeated three times. By carrying out the post-treatment as described in Example 1, a surface-treated silica gel can be obtained. The silica gel obtained by this method contained 3.45% of carbon.

Example 3

Preparation of the packing material using tris(chlorodimethylsilyl)benzene

When 1 g of tris(chlorodimethylsilyl)benzene is carried out on a porous silica gel according to the method shown in Example 1, a surface-modified silica gel containing 7.46% of carbon is obtained. Also in this case, it is confirmed by a solid-state high resolution NMR spectrum that the silane coupling agent is bonded in multi-legged type to the silica gel surface.

Example 4

Figure 3:
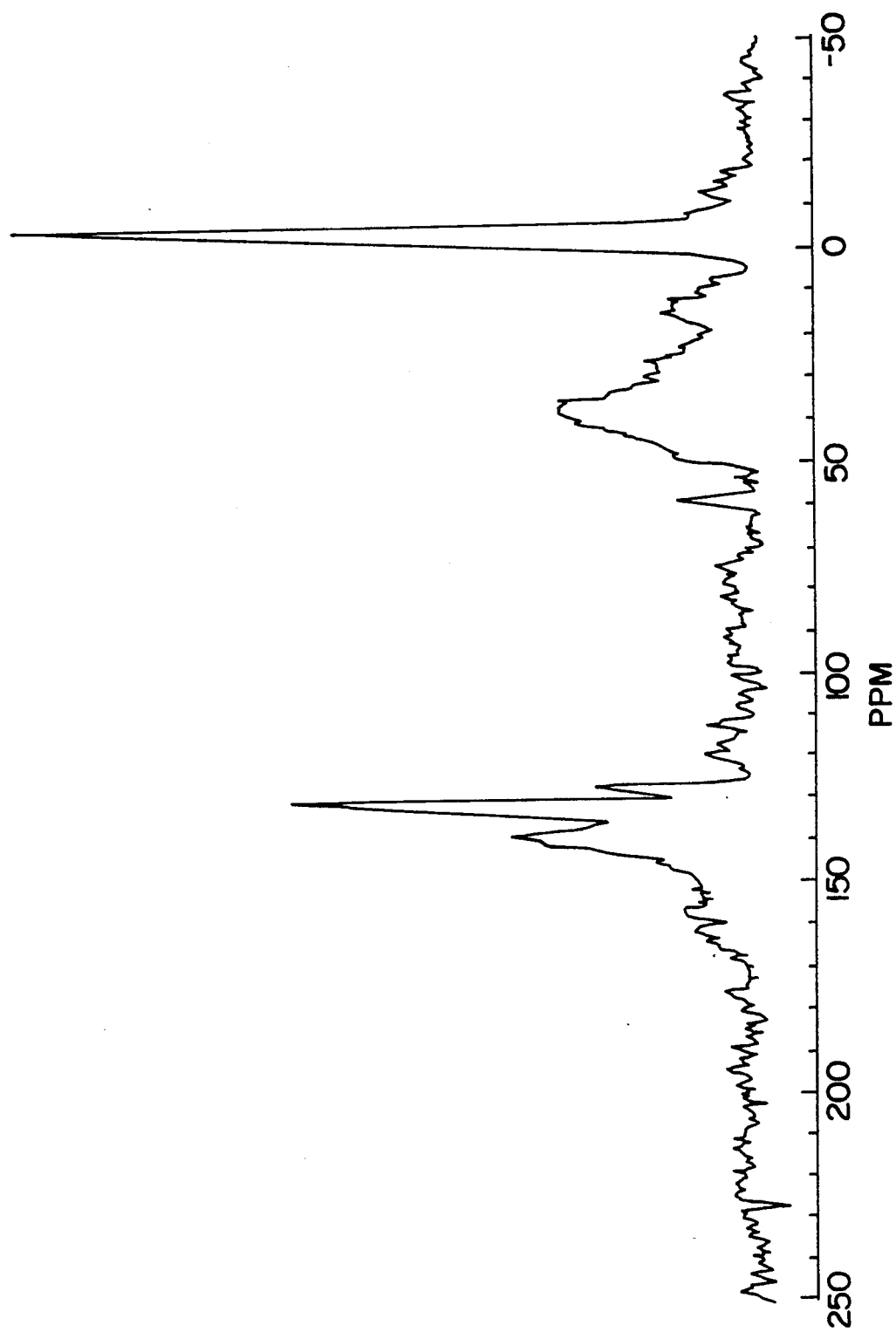
FIG. 3 is a $^{13}$C-solid high resolution NMR spectrum of the packing material according to Example 4.

Preparation of the packing material using 1,3,5-tris(4-chlorodimethylsilylphenyl)benzene This example is a repeated procedure as described in example 1 except that it uses 1,3,5-tris(4-chlorodimethylsilylphenyl)benzene (0.66 g) instead of parabis(-chlorodimethyl)benzene, and produces a surfacemodified silica gel containing 4.48% of carbon. The resulting silica gel from this method is confirmed by a solid-state high resolution NMR spectrum that the silane coupling agent is bonded in multiple to the silica gel surface (see FIG. 3).

Example 5

Preparation of the packing material using para-bis(chlorodimethylsilyl)benzene

This example is a repeated procedure as described in Example 1 except that it uses para-bis(chlorodiphenyl-silyl)benzene (0.73 g) instead of para-bis(chlorodimethylsilyl)benzene, and procedures a surface-modified silica gel containing 9.08% of carbon.

Example 6

Preparation of the packing material using 4,4'-bis(chlorodimethylsilyl)biphenyl

This example is a repeated procedure as described in Example 1 except that it uses 4,4'-bis(chlorodimethylsilyl)biphenyl instead of para-bis(chlorodimethylsilyl)-benzene, and produces a surface-modified silica gel containing 13.84% of carbon.

Application to liquid chromatography

Example 7

Into a fused-silica tube with an inner diameter of 0.53 mm and a length of 15 cm was filled according to the slurry method the silica gel surface modified with tris(-chlorodimethylsilyl)benzene shown in previous Example 3 to prepare a separation column.

Figure 4:
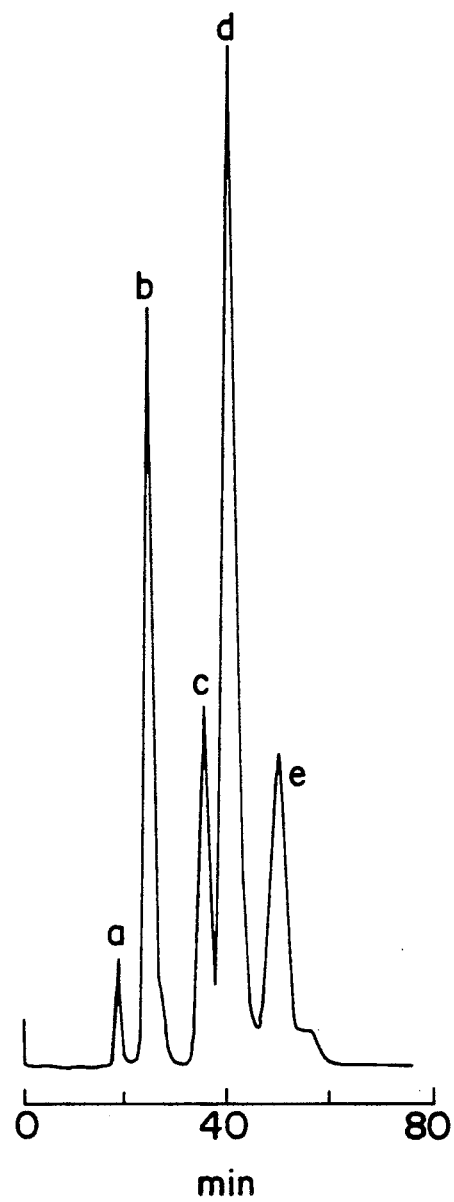
FIG. 4 is a chromatogram when a:benzene, b:naphthalene, c:anthracene, d:pyrene, e:chrysene are analyzed by use of the packing material according to Example 1.

The present column was connected to a high performance liquid chromatograph, methanol:water (70:30) is permitted to flow as the mobile phase at 2 $\mu$l/min., and benzene, naphthalene, anthracene, pyrene, chrysene are chosen as representatives of aromatic compounds and injected. By detection of the effluent at 254 nm by use of a UV detector, a chromatogram is obtained. This is shown in FIG. 4. As shown in this Figure, these substances are well separated.

Example 8

Figure 5:
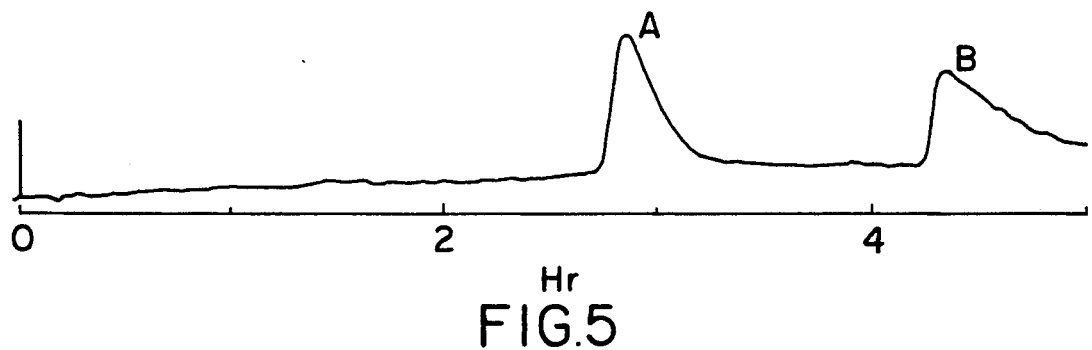
FIG. 5 is a chromatogram when A:triphenylene and B:o-terphenyl are analyzed by use of packing material according to Example 2.

By use of the column obtained in Example 7, a mixture of triphenylene and o-terphenyl was analyzed. As the mobile phase, methanol:water (60:40) is permitted to flow at a flow rate of 2 $\mu$l/min. and the effluent detected at 254 nm by use of a UV-detector. The two compounds are both aromatic compounds comprising three benzenes, and deemed to be analogous as the chromatographic behaviors governed by the electrical properties. However, the shapes of molecules are greatly different, the former having a planar structure, while the latter a non-planar structure. The chromatogram is shown in FIG. 5. Both are well separated and the retention time of triphenylene is shorter than o-terphenyl.

Example 9

Figure 6:
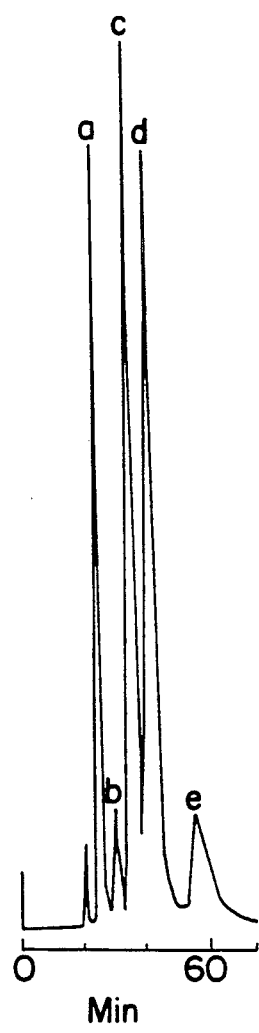
FIG. 6, 7 and 8 are chromatograms when the same sample as FIG. 4 are analyzed by use of the packing materials according to Examples 4, 5 and 6, respectively.

This example is a repeated procedure as described in Example 7 except that it uses the surface-modified silica gel according to Example 4, and methanol:water (60:40) as mobile phase. As a result, the chromatogram according to this procedure is shown in FIG. 6, each aromatic compound is well separated, respectively.

Example 10

Figure 7:
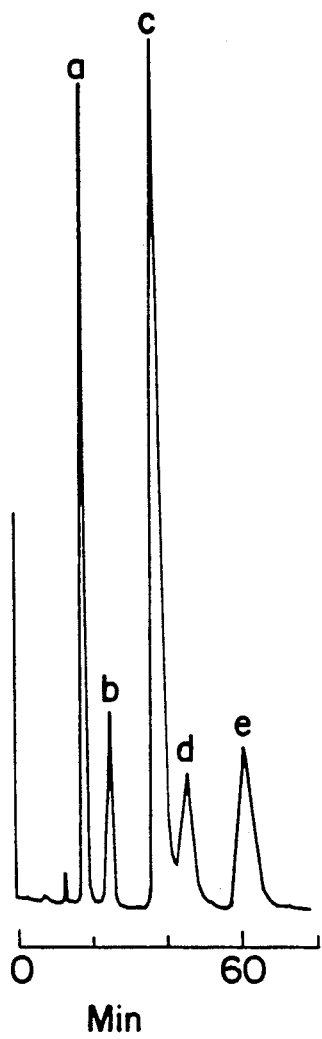

This example is a repeated procedure as described in Example 7 except that it uses the surface-modified silica gel according to Example 5. As a result, the chromatogram obtained on this procedure is shown in FIG. 7, and it is shown that each aromatic compound is well separated, respectively.

Example 11

Figure 8:
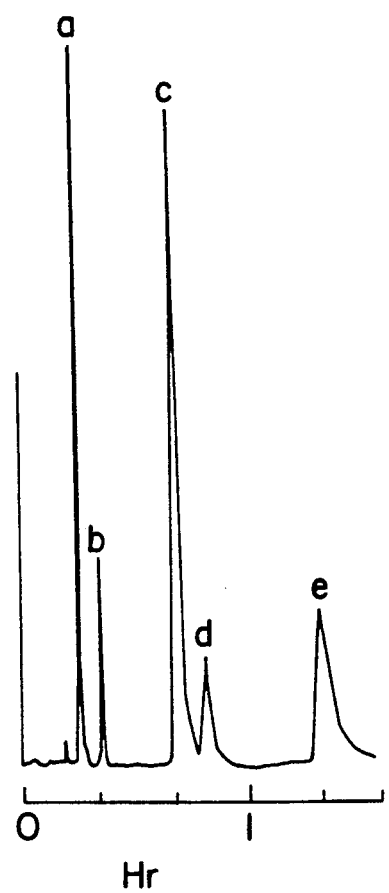

This example is a repeated procedure as described in Example 9 except that it uses the surface-modified silica gel according to Example 6. As a result, the chromatogram obtained in this procedure is shown in FIG. 8, and it is shown that each aromatic compounds is well separated, respectively.

Comparative Example 1

Figure 9:
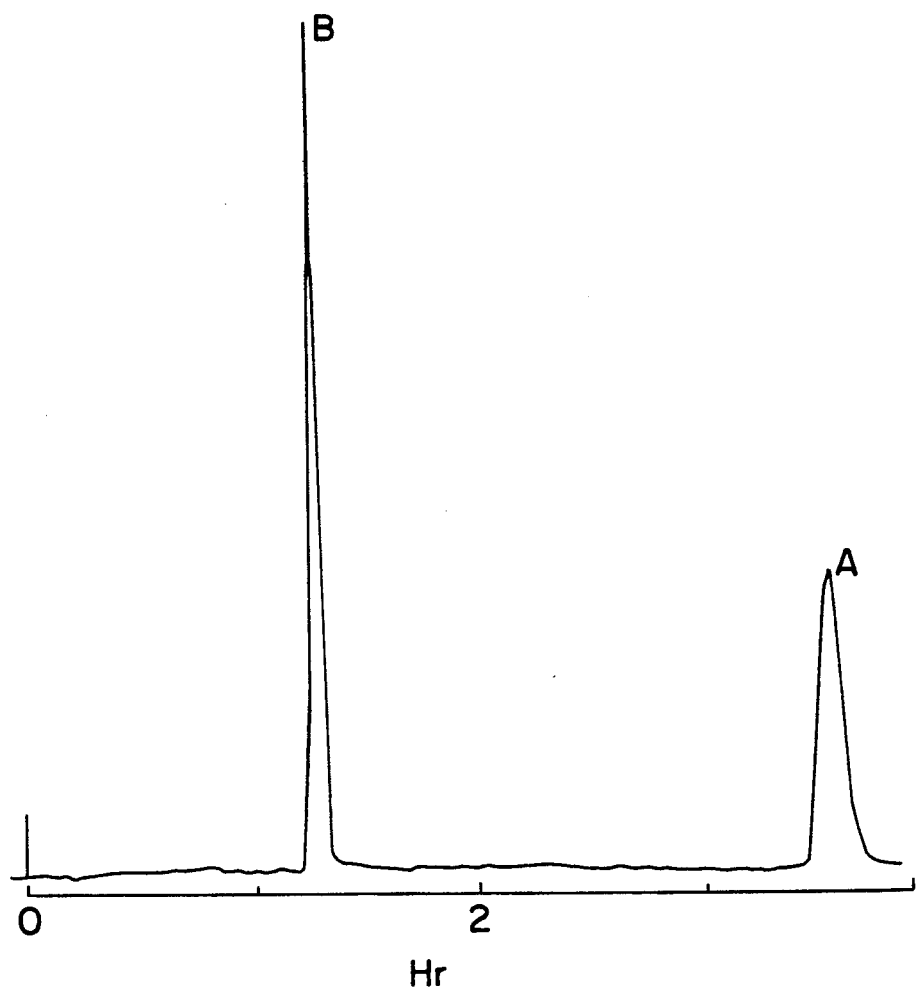
FIG. 9 is a chromatogram when A:triphenylene and B:o-terphenyl corresponding to FIG. 5 are analyzed by use of packing material "Vydac 201" that is a commercially available ODS type silica gel.

By use of the column filled with a commercially available silica gel (Vydac 201), the analytical results under the same conditions with the use of methanol:water (70:30) as the mobile phase are shown in FIG. 9. In this case, as different from the silica gel surface modified with the multiple type silane coupling agent as described in Example 2, the retention time of o-terphenyl is shorter than triphenylene.

As shown in Examples as described above, not only the packing material of the present invention has good separation characteristics as shown in FIG. 4 to 8, but it can also be understood from a comparison between FIG. 5 and FIG. 9 that it has clearly the specific separation characteristics different from those of the silica gel of the prior art.

According to the packing material for chromatography as described above, particularly in separation of a polycyclic aromatic compound (PAH) which is a carcinogeneic substance, through its $\pi$ electron - $\pi$ electron interaction, separation of molecules, which could be separated with difficulty in the prior art are rendered possible to make the column efficiently good.

INDUSTRIAL APPLICATION

The present packing material, which is a novel packing material for a liquid chromatograph column, is useful in separating various organic compounds, in particular it is useful as a packing material for separation of polycyclic aromatic compounds.

We claim:

1. A packing material for chromatography, comprising a silica gel subjected to surface modification by a multi-legged silane-coupling agent, having functional groups capable of bonding with the silanol groups on the surface of the silical gel, via two or more bonds between said silica gel and the silane-coupling agent, wherein said multi-legged silane coupling agent has the formula (I)

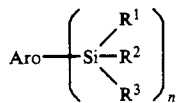

wherein Aro represents an aromatic residue;

$R^1$ and $R^2$, are independently, an alkyl group of 1 to 20 carbon atoms, alkenyl group of 3 to 5 carbon atoms, an aryl group of 6 to 12 carbon atoms optionally substituted by $C_{1-5}$ alkyl or halogen, $C_{1-4}$ alkoxy group or a halogen atom;

$R^3$ is a $C_{1-4}$ alkoxy group or halogen atom, and n is an integral number from 2 to 5.

2. A packing material according to claim 1, wherein the aromatic residue is selected from the group consisting of benzene, naphthalene, anthracene, pyrene, acenaphthylene, biphenyl, 1,3,5-tris(phenyl)benzene, thiophene, and pyridine; $R^1$ and $R^2$ are, independently, a radical selected from the group consisting of methyl, ethyl, n-propyl, isopropyl, n-butyl, tert.-butyl, n-pentyl, allyl, 2-butene, 3-butene, phenyl, 4-methylphenyl, 4-chlorophenyl, naphthalene-1-yl, naphthalene-2-yl, methoxy, ethoxy, n-propoxy, isopropoxy, n-butoxy, chlorine, bromine and iodine; $R^3$ is a group selected from the group consisting of methoxy, ethoxy, n-propoxy, isopropoxy, n-butoxy, chlorine, bromine and iodine; and n is 2 or 3.

3. A packing material according to claim 2, wherein the silane coupling agent is selected from the group consisting of para-bis(chlorodimethylsilyl)benzene, para-bis(dimethylmethoxysilyl)benzene, tris(chlorodimethylsilyl)benzene, 1,3,5-tris(4-chlorodimethylsilylphenyl)benzene, para-bis(chlorodiphenylsilyl)benzene and 4,4'-bis(chlorodimethylsilyl)biphenyl.

* * * * *